(12) United States Patent
Grannan et al.

(10) Patent No.: US 8,893,199 B2
(45) Date of Patent: Nov. 18, 2014

(54) SYSTEM AND METHOD OF MANAGING VIDEO CONTENT DELIVERY

(75) Inventors: Michael F. Grannan, Austin, TX (US); Lalitha Suryanarayana, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1791 days.

(21) Appl. No.: 11/158,926

(22) Filed: Jun. 22, 2005

(65) Prior Publication Data

US 2006/0294561 A1 Dec. 28, 2006

(51) Int. Cl.
| | |
|---|---|
| H04N 7/173 | (2011.01) |
| H04N 5/445 | (2011.01) |
| G06F 3/00 | (2006.01) |
| H04N 21/658 | (2011.01) |
| H04N 21/239 | (2011.01) |
| H04N 21/2668 | (2011.01) |
| H04N 21/262 | (2011.01) |
| H04N 21/472 | (2011.01) |

(52) U.S. Cl.
CPC ....... *H04N 7/17327* (2013.01); *H04N 21/6581* (2013.01); *H04N 21/2393* (2013.01); *H04N 21/2668* (2013.01); *H04N 21/26258* (2013.01); *H04N 21/47208* (2013.01); *H04N 21/2625* (2013.01); *H04N 21/26208* (2013.01)
USPC ................... 725/97; 725/53; 725/86; 725/87; 725/93; 725/116; 725/101

(58) Field of Classification Search
USPC ...................................................... 725/86–97
See application file for complete search history.

(56) References Cited

U.S. PATENT DOCUMENTS

| | | |
|---|---|---|
| 4,243,147 A | 1/1981 | Twitchell et al. |
| 4,356,509 A | 10/1982 | Skerlos et al. |
| 4,768,926 A | 9/1988 | Gilbert, Jr. |
| 4,907,079 A | 3/1990 | Turner et al. |
| 5,126,731 A | 6/1992 | Cromer, Jr. et al. |
| 5,163,340 A | 11/1992 | Bender |
| 5,475,835 A | 12/1995 | Hickey |

(Continued)

FOREIGN PATENT DOCUMENTS

| | | |
|---|---|---|
| WO | WO 99/63759 A2 | 12/1999 |
| WO | WO 00/28689 A2 | 5/2000 |

(Continued)

OTHER PUBLICATIONS

Wikipedia (http://en.wikipedia.org/wiki/Peer-to-peer).*

(Continued)

*Primary Examiner* — Nasser Goodarzi
*Assistant Examiner* — Fred Peng
(74) *Attorney, Agent, or Firm* — Toler Law Group, PC

(57) ABSTRACT

A system and method of managing delivery of content is disclosed. The method includes receiving a first request for delayed broadcast of a content item at a first time. The first request is from a first user having access to broadcast content. The method further includes receiving a second request for delayed broadcast of the content item at a second time. The second request is from a second user having access to broadcast content. The method further includes scheduling the content item for broadcast to a plurality of users at a third time. The third time is after the first time and after the second time. The plurality of users includes the first and second user.

28 Claims, 6 Drawing Sheets

(56) References Cited

U.S. PATENT DOCUMENTS

| | | |
|---|---|---|
| 5,532,748 A | 7/1996 | Naimpally |
| 5,541,917 A | 7/1996 | Farris |
| 5,589,892 A | 12/1996 | Knee et al. |
| 5,592,477 A | 1/1997 | Farris et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,211,901 B1 * | 4/2001 | Imajima et al. ........... 725/93 |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,756,997 B1 | 6/2004 | Ward, III et al. |
| 6,760,918 B2 | 7/2004 | Rodriguez et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |
| 6,769,127 B1 * | 7/2004 | Bonomi et al. ........... 725/39 |
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht |
| 6,788,709 B1 | 9/2004 | Hyakutake |
| 6,804,824 B1 | 10/2004 | Potrebic et al. |

(56) References Cited

U.S. PATENT DOCUMENTS

| | | |
|---|---|---|
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |
| 7,206,394 B2 * | 4/2007 | Baldwin et al. .............. 379/137 |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0097261 A1 | 7/2002 | Gottfurcht et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028890 A1 | 2/2003 | Swart et al. |
| 2003/0033416 A1 | 2/2003 | Schwartz |
| 2003/0043915 A1 | 3/2003 | Costa et al. |
| 2003/0046091 A1 | 3/2003 | Arneson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0100340 A1 | 5/2003 | Cupps et al. |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0141987 A1 | 7/2003 | Hayes |
| 2003/0145321 A1 | 7/2003 | Bates et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0226044 A1 | 12/2003 | T. Cupps et al. |
| 2003/0226145 A1 | 12/2003 | Marsh |
| 2003/0229900 A1 | 12/2003 | Reisman |
| 2004/0003041 A1 | 1/2004 | Moore et al. |
| 2004/0003403 A1 | 1/2004 | Marsh |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117824 A1 | 6/2004 | Karaoguz et al. |
| 2004/0117831 A1 * | 6/2004 | Ellis et al. .................. 725/53 |
| 2004/0128342 A1 | 7/2004 | Maes et al. |
| 2004/0133907 A1 * | 7/2004 | Rodriguez et al. .............. 725/14 |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0183839 A1 | 9/2004 | Gottfurcht et al. |

(56) References Cited

U.S. PATENT DOCUMENTS

| | | | |
|---|---|---|---|
| 2004/0194136 A1 | 9/2004 | Finseth et al. | |
| 2004/0198386 A1 | 10/2004 | Dupray | |
| 2004/0201600 A1 | 10/2004 | Kakivaya et al. | |
| 2004/0210633 A1 | 10/2004 | Brown et al. | |
| 2004/0210935 A1 | 10/2004 | Schein et al. | |
| 2004/0210936 A1* | 10/2004 | Rao et al. | 725/87 |
| 2004/0213271 A1 | 10/2004 | Lovy et al. | |
| 2004/0221302 A1 | 11/2004 | Ansari et al. | |
| 2004/0223485 A1 | 11/2004 | Arellano et al. | |
| 2004/0226035 A1 | 11/2004 | Hauser, Jr. | |
| 2004/0226045 A1 | 11/2004 | Nadarajah | |
| 2004/0239624 A1 | 12/2004 | Ramian | |
| 2004/0252119 A1 | 12/2004 | Hunleth et al. | |
| 2004/0252120 A1 | 12/2004 | Hunleth et al. | |
| 2004/0252769 A1 | 12/2004 | Costa et al. | |
| 2004/0252770 A1 | 12/2004 | Costa et al. | |
| 2004/0260407 A1 | 12/2004 | Wimsatt | |
| 2004/0261116 A1 | 12/2004 | McKeown et al. | |
| 2004/0267729 A1 | 12/2004 | Swaminathan et al. | |
| 2004/0268393 A1 | 12/2004 | Hunleth et al. | |
| 2005/0027851 A1 | 2/2005 | McKeown et al. | |
| 2005/0038814 A1 | 2/2005 | Iyengar et al. | |
| 2005/0044280 A1 | 2/2005 | Reisman | |
| 2005/0097612 A1 | 5/2005 | Pearson et al. | |
| 2005/0132295 A1 | 6/2005 | Noll et al. | |
| 2005/0195961 A1 | 9/2005 | Pasquale et al. | |
| 2007/0107035 A1* | 5/2007 | Howe et al. | 725/131 |
| 2010/0313215 A1* | 12/2010 | McCoskey et al. | 725/31 |
| 2011/0270734 A1* | 11/2011 | Gershon | 705/37 |

FOREIGN PATENT DOCUMENTS

| | | |
|---|---|---|
| WO | WO 01/60066 A1 | 8/2001 |
| WO | WO 02/017627 A2 | 2/2002 |
| WO | WO 02/058382 A1 | 7/2002 |
| WO | WO 03/003710 A2 | 1/2003 |
| WO | WO 03/025726 A1 | 3/2003 |
| WO | WO 2004/018060 A2 | 3/2004 |
| WO | WO 2004/032514 A1 | 4/2004 |
| WO | WO 2004/062279 A1 | 7/2004 |
| WO | WO 2005/045554 A2 | 5/2005 |

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.
U.S. Appl. No. 10/752,301, filed Jan. 6, 2004.
U.S. Appl. No. 11/148,967, filed Jun. 9, 2005.
U.S. Appl. No. 10/929,888, filed Aug. 26, 2004.
U.S. Appl. No. 10/915,684, filed Aug. 10, 2004.
U.S. Appl. No. 10/960,771, filed Oct. 7, 2004.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.

* cited by examiner

SYSTEM AND METHOD OF MANAGING VIDEO CONTENT DELIVERY

FIELD OF THE DISCLOSURE

The present disclosure relates generally to systems and methods for managing video content delivery.

BACKGROUND

Consumers have many options for obtaining video programming and other digital content, including video games and music. In addition to cable and satellite television services, the Internet continues to become a viable delivery mechanism as broadband adoption grows and as access networks support more bandwidth. In addition, digital video recording (DVR) devices have become a popular substitute for videocassette recorders, and many satellite and cable video providers are offering DVR features built into their set top boxes to provide time-shifted viewing capabilities. All of these trends expand video offerings for consumers.

With increasing bandwidth and advanced technology, the television user experience is likely to become increasingly interactive. Traditional cable and satellite broadcasters are able to use the 500 MHz to 1 Ghz of spectrum they have available on their networks to deliver hundreds of video channels simultaneously to a set top box in the home. The term "broadcast" in this sense truly implies the consumer is receiving and watching content that perhaps millions of other people are also watching. There is a also a need for "on demand" viewing, borne by the early DVR devices that let customers watch video content when they want, not when it is broadcast. Today, cable operators typically allocate a portion of the 750 MHz to 1 GHz spectrum available on the coax leading into each customer's home to support on-demand video programming. For example, today one (or more with compression) channel(s) are sent within a 6 MHz portion of the spectrum. Supporting a video on demand program requires allocating a portion of the bandwidth within one cable fiber node serving a large number of customers, to serve the on demand program to a single customer. Scaling to support on-demand viewing for a large percentage of the televisions receiving programming on the cable system can be problematic for cable providers since their spectrum is finite.

Current generation Digital Subscriber Line (DSL) services have a similar problem in that they are spectrum limited due to distances from the central office. Standard Asymmetric Digital Subscriber Line (ADSL) services operate in 2.2 MHz of spectrum or less. DSL has the benefit of being a star architecture—in essence every subscriber can get the maximum bandwidth achievable within that spectrum regardless of what their neighbors are doing.

Accordingly, there is a need for an improved system and method of managing content delivery.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A system and method of managing delivery of content is disclosed. The method includes receiving a first request for delayed broadcast of a content item at a first time. The first request is from a first user having access to broadcast content. The method further includes receiving a second request for delayed broadcast of the content item at a second time. The second request is from a second user having access to broadcast content. The method further includes scheduling the content item for broadcast to a plurality of users at a third time (delayed broadcast) that is after the first time and after the second time of the user requests.

In certain applications and in certain embodiments, the system may receive a content search request from a user. For example, a user may request a movie, television program, or other video content. The system may provide a plurality of delivery options to a user, including an option for delayed broadcast of the content item. The delivery options can include options for immediate delivery of an item via a broadband or other network, or delayed broadcast of the item via a broadcast or broadband network.

The system may receive a plurality of requests for delayed broadcast of a content item from a number of users. When the number of requests for a content item reaches a threshold, it may be efficient to use the limited bandwidth of a broadcast network to broadcast the content item over the broadcast network. In this way, the system can efficiently use the limited bandwidth resources of the broadcast network by providing broadcasts of those items requested by a sufficient number of users.

Figure 1:
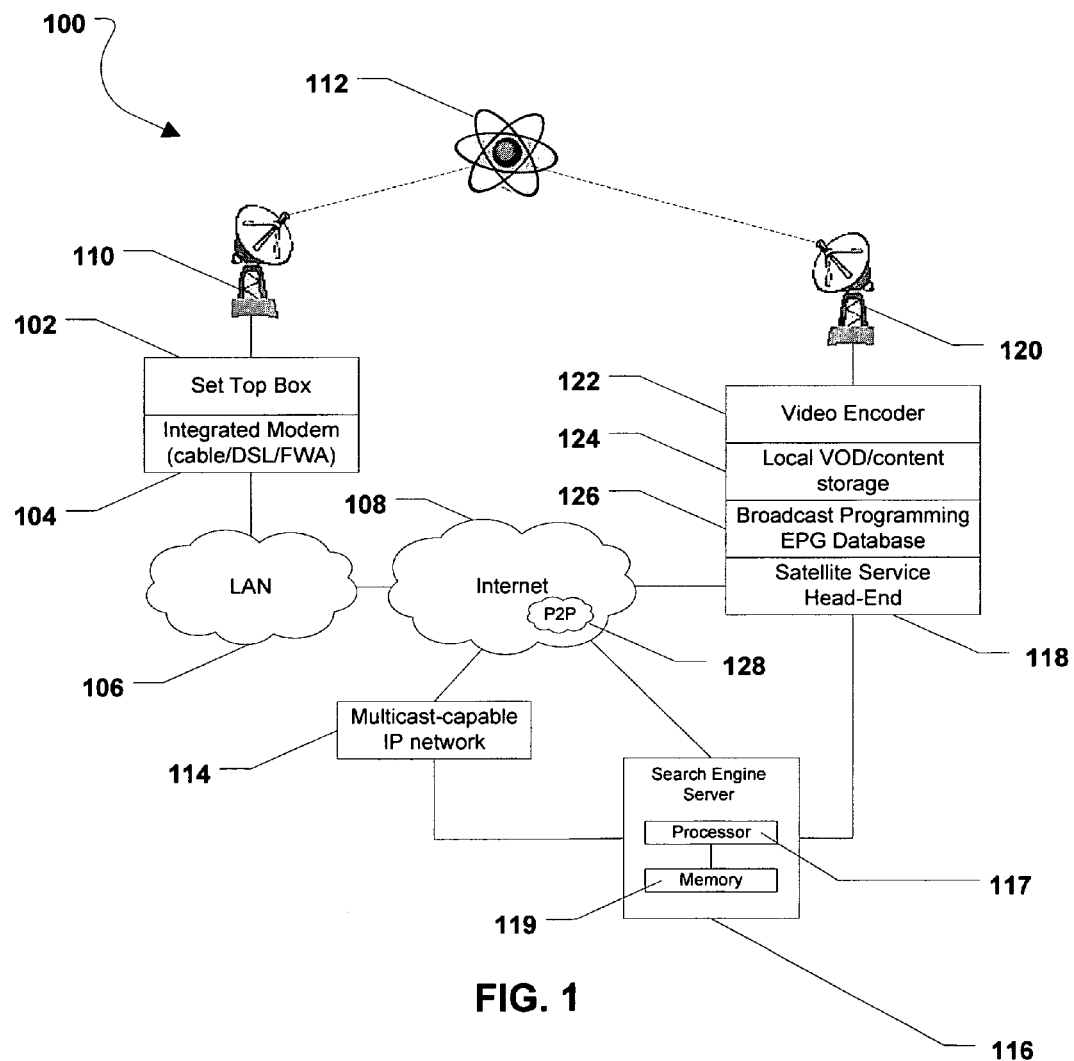
FIG. 1 is a block diagram of an exemplary content delivery system.

Referring to FIG. 1, a content delivery system is shown and is generally designated 100. As illustrated, the content delivery system 100 includes a set-top box 102, which includes an integrated modem 104. Further, the set top box 102 can be coupled to a local area network 106. As shown, the local area network 106 can be coupled to a wide area network 108, such as the Internet, which can include a peer-to-peer video sharing network 128. The local area network may be coupled to the wide area network via a satellite connection, a cable connection, a fiber connection, or other appropriate connection.

In a particular embodiment, the content delivery system 100 also includes a satellite receiver 110 that is coupled to the set top box 102. The satellite receiver is capable of receiving signals from a satellite 112. In another particular embodiment, the set top box is connected to a cable network.

FIG. 1 indicates that the wide area network 108 can be coupled to a multicast-capable internet protocol (IP) network 114 and to one or more search engine servers 116. In a particular embodiment, the multicast-capable IP network 114 is an Internet movie service. As shown in FIG. 1, in a particular embodiment, the search engine server 116 includes a processor 117 and a memory 119. In a particular embodiment, the search engine server 116 is coupled to a satellite service head-end 118. The satellite service head-end 118 is coupled to the wide area network 108. In a particular embodiment, the satellite service head-end 118 includes a broadcast programming electronic program guide (EPG) database 126, local video on demand content storage 124 and a video encoder 122. In addition, the satellite service head-end is coupled to a satellite broadcast source 120 that is capable of sending transmissions to the satellite 112.

In a particular embodiment, the set-top box 102 communicates with the local area network 106 via the integrated modem 104. The integrated modem 104 may be a cable modem, digital subscriber line (DSL) modem, fixed wireless access (FWA) modem, or other appropriate device. As shown in FIG. 1, the local area network communicates with the wide area network 108. Accordingly, the set-top box is able to communicate via the wide area network 108 with the multicast-capable IP network 114 and the search engines 116. Moreover, the set top box 102 can receive content via the wide area network 108 from the multicast-capable IP network 114 and the peer-to-peer video sharing network 128.

In a particular embodiment, the set top box 102 can also receive content from the satellite receiver 110. For example, the satellite receiver 110 can receive broadcast video content from the satellite 112 and transmit the content to the set top box 102.

Further, the set top box 102 can receive search criteria from a user and send the search criteria to the search engine server 116. In a particular embodiment, the search criteria are received via an HTML Internet web interface. In a particular embodiment, the search criteria identify video content. The search engine server 116 can use the search criteria to search databases associated with broadcast and on-demand content sources, including the electronic programming guide database and databases associated with the multicast-capable IP network 114, the local video on demand content storage 124, and the peer-to-peer video sharing network 128. Also, the search engine server 106 returns the search results to the set top box 102 via the wide area network 102. The search engine server 106 can be a stand-alone server, or can reside within the satellite service head-end 118.

The search engine server 116 may also provide delivery options to the set top box 102. These delivery options can include price, video fidelity, audio fidelity, delivery time, or other options. The delivery options may include an option for on-demand delivery of the content and an option for delayed broadcast of the content item.

In an illustrative embodiment, the satellite service head-end 118 can provide content to the satellite 112 via the satellite broadcast source 120. For example, the satellite service head-end 118 can encode video content for transmission using the video encoder 122. Further, the satellite service head-end selects content from the video on demand content storage 124. Also, in a particular embodiment, the electronic programming guide database 126 is stored by the satellite service head-end 118. The satellite service head-end 118 may provide other content, such as video game content.

The satellite service head-end 118 may receive and record requests for delayed broadcast of a content item. When the number of requests for delayed broadcast of a content item exceeds a threshold, the satellite service head-end 118 may broadcast the content item to the users that requested the item via the satellite 112. The threshold may be set so that the content item is not broadcast until it is economically efficient to use the bandwidth of the satellite 112. The service head end can include an input responsive to a plurality of users content requests, including requests for delayed broadcast of a content item. The service head-end may be connected to a broadcast transceiver, such as the satellite broadcast source 120. The broadcast transceiver may also be a cable television transceiver or other appropriate broadcast source. The broadcast transceiver may broadcast the content item after receiving the plurality of content requests from the plurality of users. The broadcast transceiver may broadcast the item after the number of requests for the content item exceeds a threshold. The content item may be a video content item, a video game item, or other content.

Figure 2:
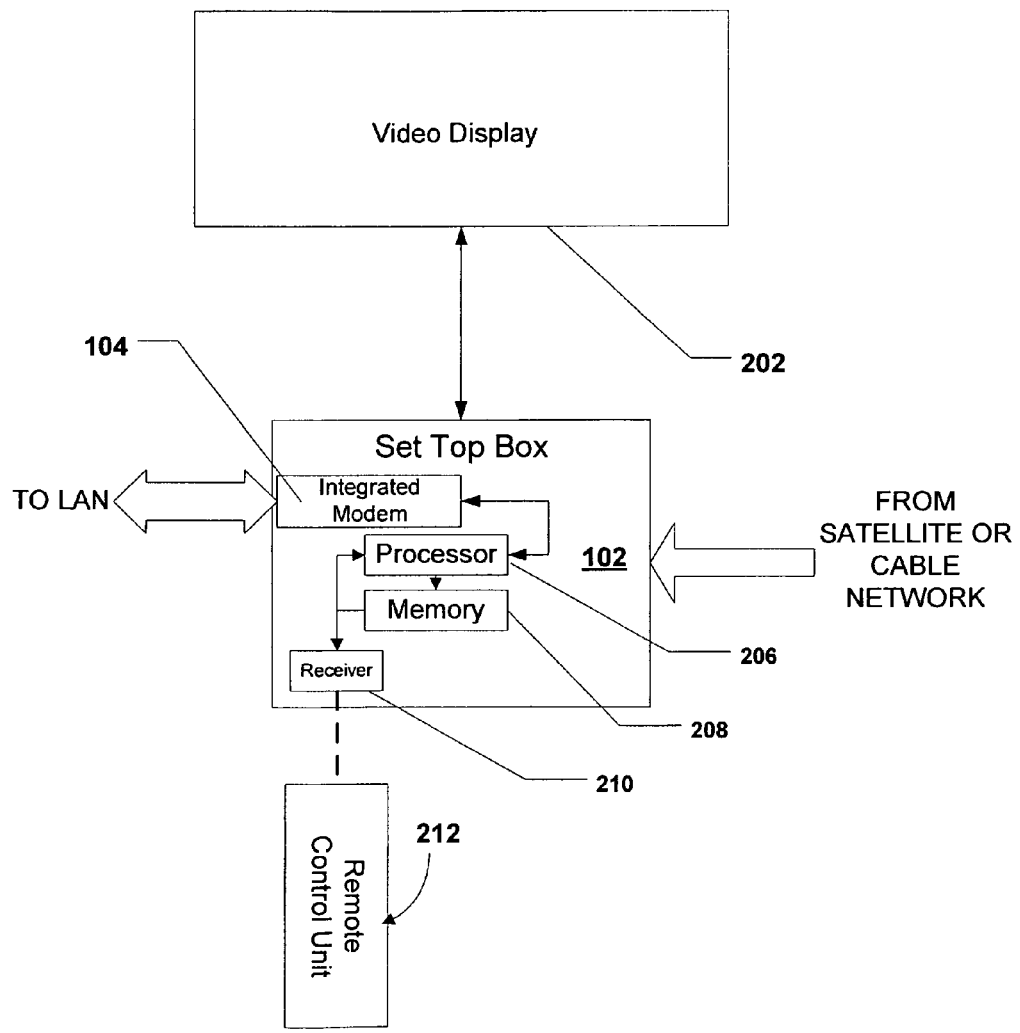
FIG. 2 is a block diagram of an exemplary embodiment of a set top box.

Referring to FIG. 2, details of a particular embodiment of the set top box 102 are illustrated. As shown, the set top box 102 can be coupled to a video display 202. In a particular embodiment, the set top box 102 can receive inputs from a remote control unit 212. Also, as depicted in FIG. 2, the set top box 102 can include an integrated modem 104 and a processor 206. In a particular embodiment, the processor 206 can be coupled to a computer readable medium, such as a memory 208 as illustrated in FIG. 2. In a particular embodiment, the processor 206 can also be coupled to a receiver 210.

In an exemplary embodiment, the receiver 210 receives inputs from the remote control unit 108. Furthermore, in a particular embodiment, the set top box 102 can transmit video content for display to the video display 202. The set top box 102 can also display a user interface on the video display 202. In a particular embodiment, the user interface includes an interface to receive video content search criteria from a user. The user can input the search criteria using remote control unit 212.

In an illustrative embodiment, the memory 208 is accessible to the processor 206 and a computer program is embedded in the memory 208. The processor executes the instructions of the computer program. In a particular embodiment, the computer program includes instructions to create search criteria based on the user input received via the receiver 210 and to communicate the search criteria to an external search engine, such as the search engine server 116 illustrated in FIG. 1, via the integrated modem 104. In a particular embodiment, the computer program also includes instructions to receive delivery options from the external search engine via the integrated modem 104. The delivery options may include an option for delayed broadcast of a content item associated with the search criteria and an option for on-demand delivery of the content item. The option for on-demand delivery may be an option to download the content item, on option to immediately play the content item, or other on-demand delivery option.

Figure 3:
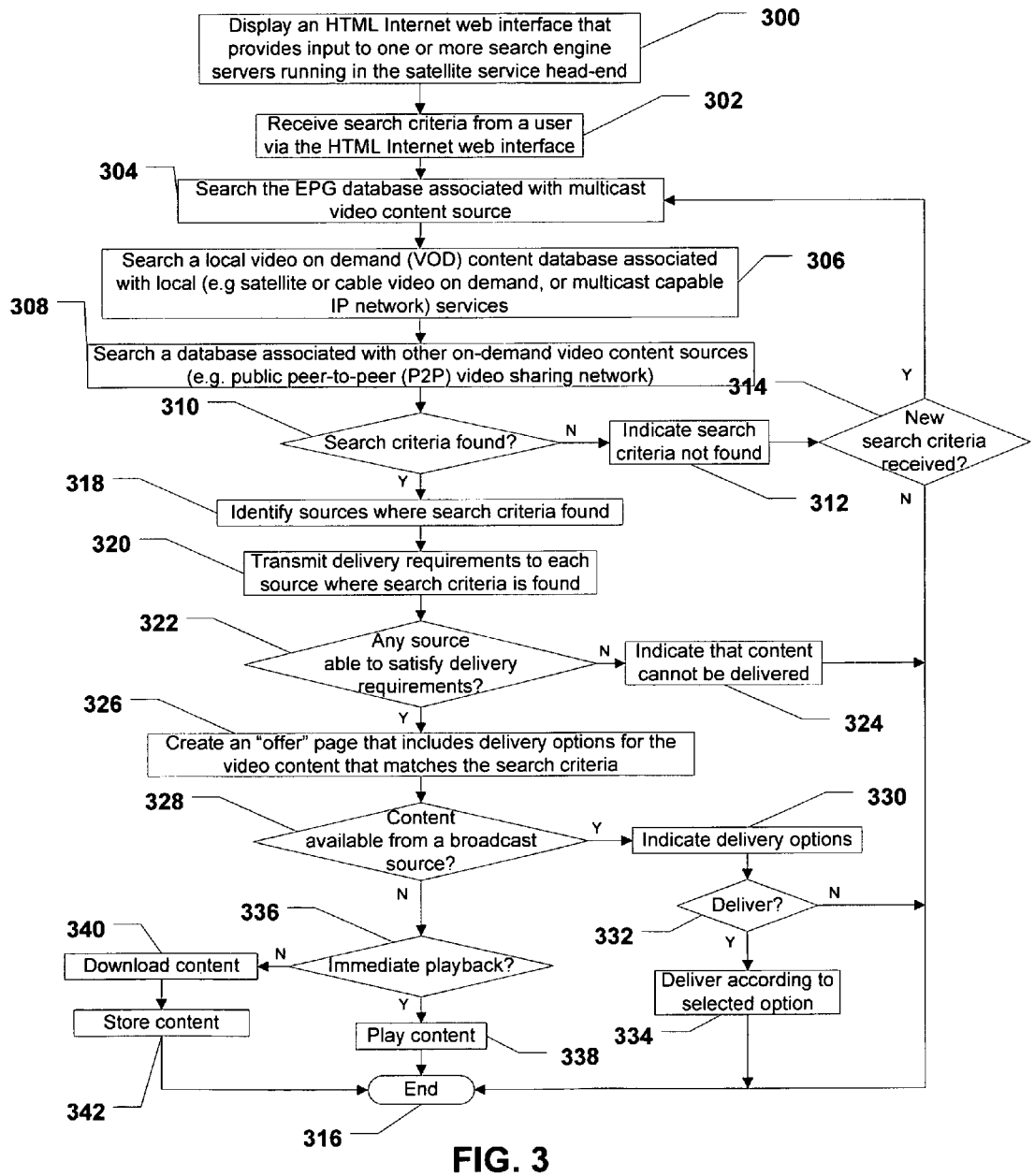
FIG. 3 is a flow chart to illustrate an exemplary method of managing content delivery.

Referring to FIG. 3, a method of managing video content delivery is illustrated. Commencing at step 300, a set top box displays an HTML web interface that provides input to a search engine server running at a satellite service head-end. The search engine server receives search criteria from a user via the HTML Internet web interface, at step 302. In a particular embodiment, the search criteria include user location information, television program title, movie title, performer name, team name, and program subject matter. Moving to step 304, the search engine server searches an electronic programming guide database associated with a broadcast video content source with the search criteria. Next, at step 306, the search engine searches a local video on demand content database associated with local services, such as satellite or cable video on demand services or an IP network. At step 308, the search engine server searches a database associated with other on-demand video content sources, such as a public peer-to-peer (P2P) network.

Proceeding to decision step 310, the search engine determines whether the search criteria are found at any of the video content sources. If the search criteria are not found, the search engines indicate this condition at step 312. In a particular embodiment, the search engine server sends an indication that the search criteria were not found to the set top box. The set top box can then display this information on a video display for a user. The user can then enter new search criteria. Moving to decision step 314, the search engine determines whether it has received new search criteria. If new search criteria are received, the method returns to block 304 and proceeds as described herein; otherwise, the method ends at block 316.

Returning to step 310, if the search engine server determines that the search criteria are found, the method proceeds to step 318 and the search engine server identifies the sources where the criteria are found. Thereafter, at step 320, the search engine server transmits delivery requirements to each source where the search criteria are found. In a particular embodiment, the delivery requirements can include delivery time, video fidelity, audio fidelity, price, and user-profile information. Also, in a particular embodiment, the user-profile information can include user credit information. Moving to step 322, the search engine server determines whether any source can meet the delivery requirements. If no source can meet the delivery requirements, the method proceeds to step 324 and the search engine server indicates to the set top box that the content cannot be delivered. The method then ends at step 316. Returning to decision step 322, if the search engine determines that there is a source able to satisfy the delivery requirements, the method moves to step 326 and the search engine server creates an offer page. The offer page includes delivery options for the content item. In a particular embodiment, the delivery options include price, video fidelity, audio fidelity, and delivery time.

Proceeding to decision step 328, the set top box determines whether the video content is available from a broadcast source. If the video content is available from a broadcast source, the method moves to step 330 and the search engine server indicates delivery options to the set top box at step 330. In a particular embodiment, a user selects from the delivery options at the set top box. At step 332, the set top box determines whether a delivery option has been selected. If no delivery option has been selected, the method ends at step 316. If a delivery option has been selected, the method moves to step 334 and the set top box delivers the content according to the selected option. In a particular embodiment, the set top box delivers the content by receiving a video stream provided by the video content source.

Returning to step 328, if the set top box determines that the video content is not available from a broadcast source, the method proceeds to step 336. At decision step 336, the set top box determines whether immediate playback is requested. If immediate playback is requested, the method proceeds to step 338 and the set top box plays the content item video stream. If immediate playback is not requested, the method proceeds to step 340 and the set top box downloads the content item. At step 342, the set top box stores the content item. The method then ends at state 316.

Figure 4:
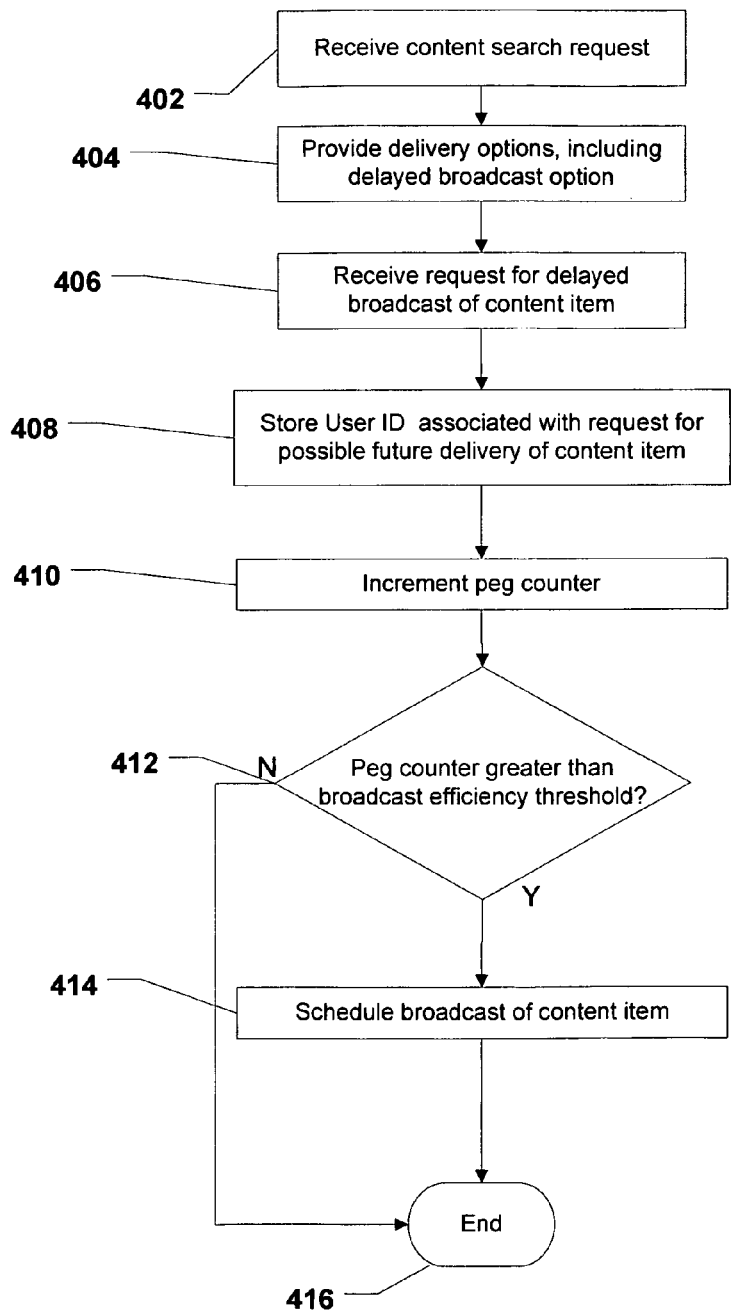
FIG. 4 is a flow chart to illustrate an exemplary method of recording user requests for delayed broadcast of content.

Referring to FIG. 4, a method of recording instances of requests for delayed broadcast of content is illustrated. Beginning at step 402, a content search request for a content item is received. At step 404, delivery options are provided, including the option for delayed broadcast of the content item.

Proceeding to step 406, a request is received for delayed broadcast of the content item. Moving to step 408, user identification information associated with the request is stored for possible future delivery of the content item. Proceeding to step 410, a peg counter is incremented. At decision step 412, it is determined whether the peg counter exceeds a broadcast efficiency threshold. In a particular embodiment, the broadcast threshold is set such that the content item is efficiently broadcast to the plurality of users requesting delayed broadcast of the content item. If the peg counter is not greater than the efficiency threshold, the method ends at step 416. On the other hand, if the peg counter is greater than the broadcast efficiency threshold, the method moves to step 414 and the content item is scheduled for broadcast to the plurality of users requesting the content item. The set top boxes for the users that had requested the content may then use some form of conditional access system to gain rights to view the content when it is broadcast, and automatically configure the DVR of the set top box to record the program.

Figure 5:
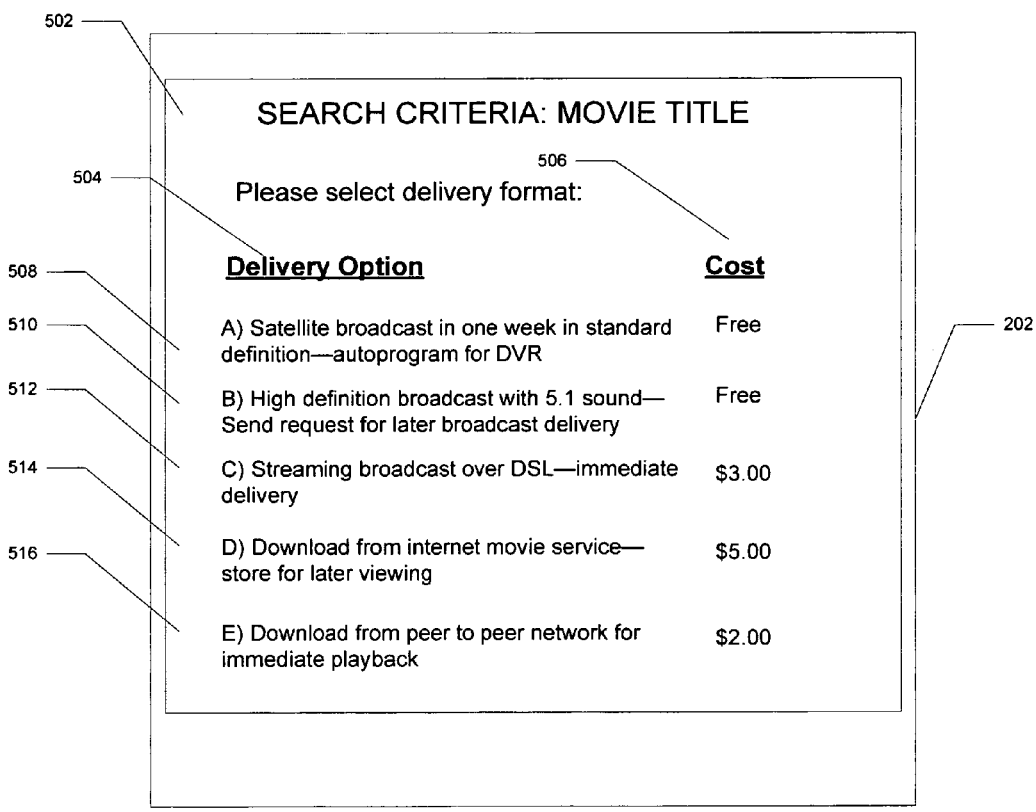
FIG. 5 is block diagram of a video display of content delivery options.

Referring to FIG. 5, a video display of content delivery options is illustrated. The a video display, such as the video display 202 illustrated in FIG. 2, includes a display of search criteria 502. This search criteria may be entered by a user. The video display 202 also includes a delivery option column 504 and a cost column 506. The delivery option column 504 and the cost column 506 include a plurality of delivery options and associated costs, including options 508, 510, 512, 514 and 516. A user may select from among the options for delivery of a content item. For example, a user may select option 508 to schedule recording of a satellite broadcast of the content item. Option 510 is an option to schedule delayed broadcast of the content item indicated by search criteria 502. Selection of option 510 can cause the transmission of a request for later broadcast delivery of the content item. The content item may be scheduled for broadcast after a sufficient number of users have requested broadcast of the content item so that transmitting the content item via a broadcast network is economically feasible.

Figure 6:
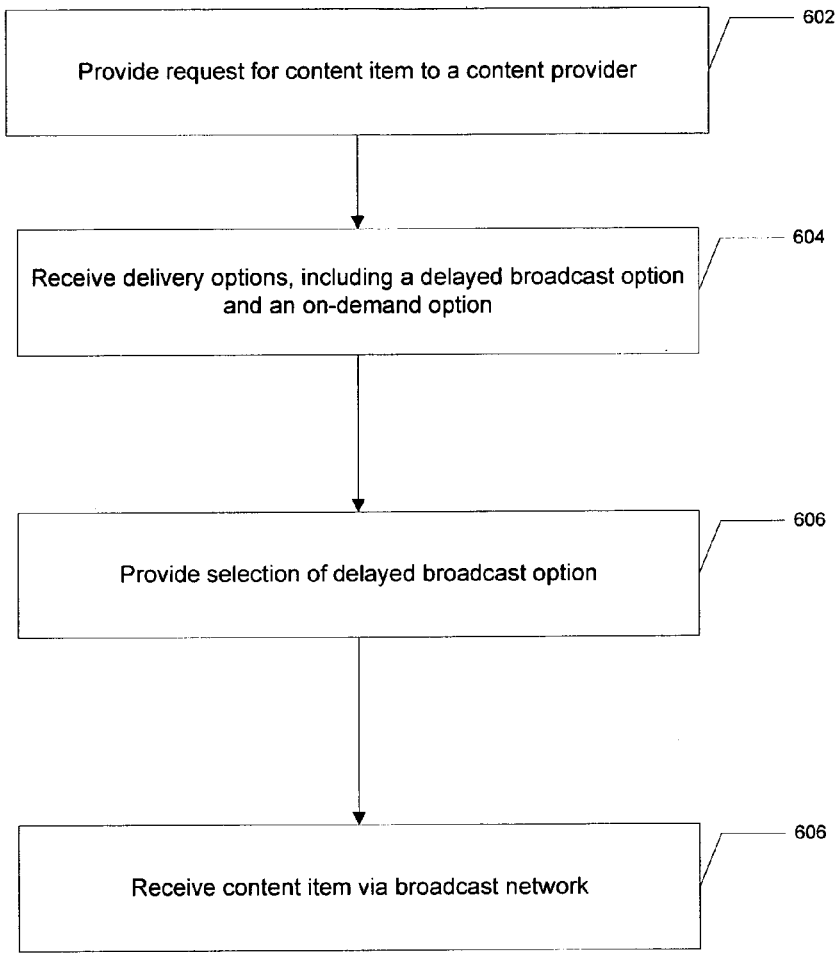
FIG. 6 is a flow chart to illustrate an exemplary method of requesting content delivery.

Referring to FIG. 6, a method of requesting content delivery is illustrated. At step 602, a request for a content item is provided to a content provider. This request may be provided via a search request, as illustrated in FIG. 5. Moving to step 604, delivery options are received, including an on-demand delivery option and an option for delayed broadcast of the content item. At step 606, a selection of a delayed broadcast option is provided. Proceeding to step 608, the content item is received via a broadcast network. The content item may be distributed over a broadcast network depending on a number of requests for the content item.

With the configuration and structure described herein, the disclosed system and method allows a content provider to leverage the limited bandwidth of a broadcast network to efficiently transmit on-demand content. The system and method determines when a sufficient number of user requests for a content item exceeds a threshold, such that it is efficient to transmit the content item to those users via a broadcast network.

In addition, the system and method allow a user to search multiple sources of video content and choose from a variety of delivery options. This presents the user with a wider range of viewing choices and pricing options. In addition, the disclosed system and method allows a user to conveniently schedule delivery of video content at an appropriate time.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a head end that supports a plurality of end user media devices, input from a user device that indicates selection of a delayed delivery option of a particular content item from a search result listing, wherein the search result listing is generated at a search engine based on a search request and a delivery requirement received from the user device, and wherein an entry of the search result listing identifies a content item and a delivery option for the content item;
incrementing a pea counter associated with the particular content item in response to receiving the input, wherein the pea counter indicates a number of requests received for delayed delivery of the particular content item;
storing user information associated with the input;
comparing, at the head end, a value of the pea counter to a broadcast efficiency threshold; and
when the value of the pea counter exceeds the broadcast efficiency threshold:
scheduling, at the head end, delivery of the particular content item to a plurality of user devices that requested delayed delivery of the particular content item; and
resetting the peg counter.

2. The method of claim 1, wherein the search result listing is a portion of an offer page.

3. The method of claim 1, wherein the search result listing includes at least one an additional delivery option in addition to the delayed delivery option.

4. The method of claim 3, wherein the additional delivery option includes an immediate delivery option.

5. The method of claim 1, wherein the search result listing results from a content search request that includes a delivery parameter.

6. The method of claim 5, wherein the delivery parameter includes a price, a video fidelity, an audio fidelity, or a delivery time.

7. The method of claim 1, wherein the entry of the search result listing includes a price, a video fidelity, an audio fidelity, a delivery time, or a combination thereof.

8. The method of claim 1, further comprising sending an offer page to the user device prior to receiving the input from the user device, wherein the input corresponds to a particular delivery option included in a display of the offer page.

9. The method of claim 3, wherein the additional delivery option includes downloading the particular content item from a peer-to-peer network for immediate playback.

10. The method of claim 1, wherein the particular content item is a video game.

11. The method of claim 1, wherein scheduling delivery of the particular content item comprises scheduling delivery of the particular content item via a broadcast network.

12. A method comprising:
receiving a search request and a delivery requirement at a search engine server, the search request received from a set top box;
performing a search at the search engine server of a plurality of databases to identify video content sources able to provide content that satisfies the search request;
sending the delivery requirement to the video content sources to determine a particular video content source able to satisfy the delivery requirement;
providing a search result to the set top box that satisfies the search request and the delivery requirement, wherein an entry of the search result identifies a particular video content item available from the particular video content source and a delayed delivery option for the particular video content item;
receiving a selection of the entry that identifies the particular video content item and the delayed delivery option from the search result;
incrementing a peg counter associated with the particular video content item in response to the selection;
storing user information associated with the selection; and
when a determination indicates a value of the peg counter exceeds a broadcast efficiency threshold:
scheduling a broadcast of the particular video content item to a plurality of user devices that requested delayed delivery of the particular video content item; and
resetting the peg counter.

13. The method of claim 12, wherein the plurality of databases includes an electronic programming guide database.

14. The method of claim 12, wherein the plurality of databases includes a local video on demand content database.

15. The method of claim 12, wherein the video content sources include a multicast-capable internet protocol network.

16. The method of claim 12, wherein the search request includes user location information, a content title, a performer name, a team name, program subject matter, or any combination thereof.

17. The method of claim 12, wherein the delivery requirement includes a price, a video fidelity, an audio fidelity, a delivery time, or any combination thereof.

18. The method of claim 12, wherein a second entry of the search result identifies the particular video content item and indicates the particular video content is available for immediate delivery via streaming for a first price.

19. The method of claim 18, wherein the first price is greater than a second price associated with the delayed delivery option.

20. The method of claim 12, wherein the plurality of databases includes a database associated with a peer-to-peer network.

21. A device comprising:
a processor;
a memory accessible to the processor; and
a computer program embedded within the memory, the computer program comprising instructions executable by the processor to perform operations including:
receiving input from a user device indicating selection of an entry from a search result listing, wherein the search result listing is generated at a search engine based on a search request and a delivery requirement received from the user device, and wherein the input identifies a delayed delivery option of a particular content item;
incrementing a peg counter associated with the particular content item in response to the input, wherein the peg counter indicates a number of requests received for delayed delivery of the particular content item;
storing user information associated with the input; and
when a determination indicates a value of the peg counter exceeds a broadcast efficiency threshold:
scheduling a broadcast of the particular content item to a plurality of user devices that requested delayed delivery of the particular content item; and
resetting the peg counter.

22. The device of claim 21, wherein a first particular entry in the search result listing is associated with a video game.

23. The device of claim 21, wherein a second particular entry in the search result listing is associated with a video content item.

24. A computer-readable storage device comprising instructions executable by a processor to perform operations including:
sending a search result listing to a user device via a network, wherein the search result listing is generated at a search engine server based on a search request and a delivery requirement received from the user device, and wherein an entry of the search result listing identifies a content item and a delivery option for the content item;

receiving input from the user device via the network, wherein the input indicates selection of a delayed delivery option of a particular content item from the search result listing;

incrementing a peg counter associated with the particular content item in response to receiving the input, wherein the peg counter indicates a number of requests received for delayed delivery of the particular content item;

storing user information associated with the input;

comparing a value of the peg counter to a broadcast efficiency threshold; and when the value of the peg counter exceeds the broadcast efficiency threshold:

scheduling delivery of the particular content item to a plurality of user devices that requested delayed delivery of the particular content item; and resetting the peg counter.

25. The computer-readable storage device of claim 24, wherein the network is the internet.

26. A computer-readable storage device comprising instructions executable by a processor to perform operations including:

receiving data from a user device, wherein the data includes a search request criterion and a delivery requirement;

determining content sources able to provide content that satisfies the search request criterion and the delivery requirement;

sending a search result listing to the user device that includes content sources that satisfy the search request criterion and the delivery requirement, wherein an entry of the search result listing identifies a particular content item, a delayed delivery option, and a cost associated with the delayed delivery option;

receiving, from the user device, second data indicating selection of the entry that identifies the particular content item and the delayed delivery option from the search result listing;

incrementing a peg counter associated with the particular content item in response to the second data;

storing user information associated with the second data; and when a determination indicates a value of the peg counter exceeds a broadcast efficiency threshold:

scheduling a broadcast of the particular content item to a plurality of user devices that requested delayed delivery of the particular content item; and resetting the peg counter.

27. The computer-readable storage device of claim 26, wherein the search result listing includes a second entry that identifies the particular content item, a download and store delivery option, and a cost associated with the download and store delivery option, wherein the cost associated with the download and store delivery option is greater than the cost associated with the delayed delivery option, and wherein the operations further include:

receiving, from the user device, third data indicating selection of the second entry that identifies the particular content item, the download and store delivery option; and sending the particular content item to the user device for storage.

28. The computer-readable storage device of claim 26, wherein the search request criterion includes user location information, a content title, a performer name, a team name, program subject matter, or combinations thereof and wherein the delivery requirement includes a price, a video fidelity, an audio fidelity, or combinations thereof.

* * * * *